(12) United States Patent
Spalding

(10) Patent No.: US 11,534,993 B2
(45) Date of Patent: Dec. 27, 2022

(54) VACUUM BAG-LESS COMPOSITE REPAIR SYSTEMS AND METHODS

(71) Applicant: The Boeing Company, Chicago, IL (US)

(72) Inventor: John F. Spalding, Tukwila, WA (US)

(73) Assignee: The Boeing Company, Chicago, IL (US)

( * ) Notice: Subject to any disclaimer, the term of this patent is extended or adjusted under 35 U.S.C. 154(b) by 288 days.

(21) Appl. No.: 16/669,247

(22) Filed: Oct. 30, 2019

(65) Prior Publication Data

US 2021/0129463 A1 May 6, 2021

(51) Int. Cl.
*B29C 73/04* (2006.01)
*B29L 31/30* (2006.01)

(52) U.S. Cl.
CPC ....... *B29C 73/04* (2013.01); *B29L 2031/3076* (2013.01)

(58) Field of Classification Search
CPC ......... B29C 73/04; B29C 73/00; B29C 73/10; B29L 2031/3076
See application file for complete search history.

(56) References Cited

U.S. PATENT DOCUMENTS

| 5,196,457 | A | 3/1993 | Wilkinson et al. |
| 2001/0008161 | A1 | 7/2001 | Kociemba et al. |
| 2007/0095457 | A1* | 5/2007 | Keller ........ B64F 5/40 156/94 |
| 2012/0080135 | A1* | 4/2012 | Evens ...... B32B 37/10 156/94 |
| 2012/0093659 | A1* | 4/2012 | Muschke ..... B29D 99/0028 416/241 R |
| 2017/0232693 | A1* | 8/2017 | Delehouze ...... B29C 73/10 156/94 |

FOREIGN PATENT DOCUMENTS

EP 3153289 A1 4/2017

OTHER PUBLICATIONS

European Application Serial No. 20191550.1, Search Report dated Mar. 25, 2021, 7 pgs.

* cited by examiner

*Primary Examiner* — Daniel McNally
(74) *Attorney, Agent, or Firm* — Kwan & Olynick LLP

(57) ABSTRACT

Described are methods and systems for repair of composite components without the use of vacuum bagging. The systems described herein include a composite repair structure with a repair laminate and a film sealant. The film sealant covers the repair laminate to prevent intrusion of air and other volatiles during bonding of the composite repair structure to the composite being repaired. As the film sealant prevents intrusion of air and other volatiles, the composite repair structure can be bonded to the structure to be repaired without the use of a vacuum bag. Thus, vehicle components can be repaired without disassembly from the vehicle.

20 Claims, 7 Drawing Sheets

VACUUM BAG-LESS COMPOSITE REPAIR SYSTEMS AND METHODS

BACKGROUND

Current composite repair processes require vacuum bags for repair of composite laminates. However, use of vacuum bags adds complication to the repair process. For example, in certain processes, the vacuum bag must pass a vacuum leak check and maintain a minimum vacuum to ensure that the vacuum bag provides adequate sealing. These vacuum requirements are problematic as they cannot be met in many repair instances. For example, it is often difficult or impossible for vacuum bags used to repair composite propulsion structures, such as acoustic inlets and thrust reverser inner walls, with sound attenuating features, such as perforated composite face sheets and slotted honey comb cores, to pass these requirements. Such perforations or slotted features are difficult or impossible to seal and create a large number of possible leak paths.

To overcome this problem, repair of these propulsion structures require the structures to be removed from the aircraft and disassembled so that they can be completely enclosed in a giant vacuum bag. The number of labor hours required to disassemble and then reassemble the part adds days to the repair process, complicates the repair process, and requires specialized equipment and facilities, increasing the cost of repair and the downtime of aircraft.

SUMMARY

Described are methods and systems for repair of composite components without the use of vacuum bagging. Systems described herein allow for repair of a structure, such as a vehicle structure, with a composite repair patch known as a composite repair structure. The composite repair structure can be bonded to a vehicle structure through the application of heat and positive pressure. To prevent air and volatiles from intruding during bonding of the composite repair structure to the vehicle structure, the composite repair structure includes a film sealant disposed over a repair laminate. As the film sealant prevents intrusion of air and other volatiles, the composite repair structure can be cured and bonded to the structure to be repaired without the use of a vacuum bag.

Illustrative, non-exclusive examples of inventive features according to present disclosure are described in following enumerated paragraphs:

A1. Method 400 comprising:
forming (step 420) composite repair structure 200, wherein composite repair structure 200 comprises repair laminate 206, and wherein forming (step 420) composite repair structure 200 comprises applying (step 404) film sealant 202 to first surface 204A of repair laminate 206;
coupling (step 410) composite repair structure 200 to vehicle structure 120; and
curing and/or bonding (step 422) composite repair structure 200 to vehicle structure 120 by providing (step 416) positive pressure 320 to composite repair structure 200 coupled to vehicle structure 120, wherein film sealant 202 prevents air intrusion into repair laminate 206 during curing and/or bonding of composite repair structure 200 to vehicle structure 120.

A2. Method 400 of paragraph A1, wherein curing and/or bonding (step 422) composite repair structure 200 to vehicle structure 120 further comprises providing (step 414) heat to composite repair structure 200 coupled to vehicle structure 120.

A3. Method 400 of any one of paragraphs A1-A2, wherein film sealant 202 is further applied (step 404) to second surface 204B opposite first surface 204A of repair laminate 206.

A4. Method 400 of any one of paragraphs A1-A3, wherein positive pressure 320 is provided (step 416) without vacuum.

A5. Method 400 of any one of paragraphs A1-A4, wherein forming 420 composite repair structure 200 further comprises:
applying (step 405) heat to composite repair structure 200 to degas composite repair structure 200;
disposing composite repair structure 200 within chamber 500, wherein chamber 500 is configured to minimize compaction on composite repair structure 200 when a vacuum is present within chamber 500; and
providing (step 406) vacuum within chamber 500.

A6. Method 400 of any one of paragraphs A1-A5, wherein repair laminate 206 comprises resin 208, and wherein film sealant 202 has a higher minimum viscosity temperature than resin 208.

A7. Method 400 of any one of paragraphs A1-A6, wherein forming (step 420) composite repair structure 200 further comprises laying (step 402) up a plurality of repair laminate 206.

A8. Method 400 of any one of paragraphs A1-A7, wherein curing and/or bonding (step 422) composite repair structure 200 further comprises prepping (step 412) composite repair structure 200 after coupling (step 410) composite repair structure 200 to vehicle structure 120, wherein prepping (step 412) composite repair structure 200 comprises:
applying release film 312 to a portion of composite repair structure 200; and applying compliance layer 314 to the portion of composite repair structure 200.

A9. Method 400 of any one of paragraphs A1-A8, wherein coupling the composite repair structure 200 to vehicle structure 120 comprises:
applying film adhesive 310 to portion 322 of vehicle structure 120;
coupling composite repair structure 200 to film adhesive 310;
disposing compaction bag 318 over composite repair structure 200 after composite repair structure 200 has been coupled to film adhesive 310 to seat composite repair structure 200; and
removing compaction bag 318.
Alternatively, venting compaction hag 318 to atmosphere to remove vacuum from repair laminate 206 and applying positive pressure and heat through or over compaction bag 318.

A10. Method 400 of any one of paragraphs A1-A9, wherein composite repair structure 200 is coupled to vehicle structure 120 when vehicle structure 120 is coupled to vehicle 100.

A11. A composite repair structure 200, composite repair structure 200 comprising:
a repair laminate 206; and
a film sealant 202 disposed on a first surface 204A of the repair laminate 206, wherein the composite repair structure 200 is configured to be cured and/or bonded to a vehicle structure 120 through positive pressure 320 applied to the composite repair structure 200 when the composite repair structure 200 is coupled to the vehicle structure 120, and wherein the film sealant 202 prevents air intrusion into the repair laminate 206 during curing and/or bonding of the composite repair structure 200 to the vehicle structure 120.

A12. Composite repair structure 200 of paragraph A11, wherein the film sealant 202 is further disposed on a second surface 204B opposite the first surface 204A of the repair laminate 206.

A13. Composite repair structure 200 of any one of paragraphs A11-A12, wherein the repair laminate 206 comprises a resin 208, and wherein the film sealant 202 has a higher minimum viscosity temperature than the resin 208.

A14. A method 420 of forming composite repair structure 200 of any one of paragraphs A11-A13, the method comprising:

laying up 402 repair laminate 206;

applying 405 heat to repair laminate 206 to degas repair laminate 206; and applying 404 film sealant 202 to first surface 204A.

A15. Method 420 of paragraph A14, wherein applying 405 heat to repair laminate 206 to degas repair laminate 206 comprises:

reducing a viscosity of resin 208 of repair laminate 206; and covering fibers of repair laminate 206 with the resin 208.

A16. An apparatus comprising:

a vehicle structure 120; and a composite repair structure 200 bonded to a portion of the vehicle structure the composite repair structure 200 comprising:

a repair laminate 206; and a film sealant 202 disposed on a first surface 204A of the repair laminate 206, wherein the film sealant 202 is configured to prevents air intrusion into the repair laminate 206 during curing and/or bonding of the composite repair structure 200 to the vehicle structure 120.

A17. The apparatus of paragraph A16, wherein the film sealant 202 is further disposed on a second surface 204B opposite the first surface 204A of the repair laminate 206.

A18. The apparatus of any one of paragraphs A16-A17, wherein the repair laminate 206 comprises a resin 208, and wherein the film sealant 202 has a higher minimum viscosity temperature than the resin 208.

A19. The apparatus of any one of paragraphs A16-A18, the apparatus further comprising:

a release film 312 disposed on the portion of the vehicle structure 120;

a compliance layer 314 disposed on the portion of the vehicle structure 120; and a weight, pneumatic bladder, or actuator coupled to the composite repair structure 200 to apply positive pressure 320 on the composite repair structure 200.

A20. The apparatus of any one of paragraphs A16-A19, wherein the vehicle structure 120 is a propulsor, a fuselage, or a wing.

These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Currently, technique to repair certain composite vehicle components, such as nacelles or propulsor inlets with noise attenuation features, is to remove the components from the vehicle and strip down the components before repairing with a vacuum bag. Even minor repairs require removal of these very large and expensive parts from the vehicles and placement of these parts within vacuum bags. Furthermore, disassembly (fastener removals, separating surface sealed components, removal of rivets, and other such disassembly steps) and subsequent handling of such large unwieldy structures greatly increase the risk of incidental damage to the part. Thus, such techniques require a large number of hours and great care to perform and add complication and expense to the repair process.

Figure 1:
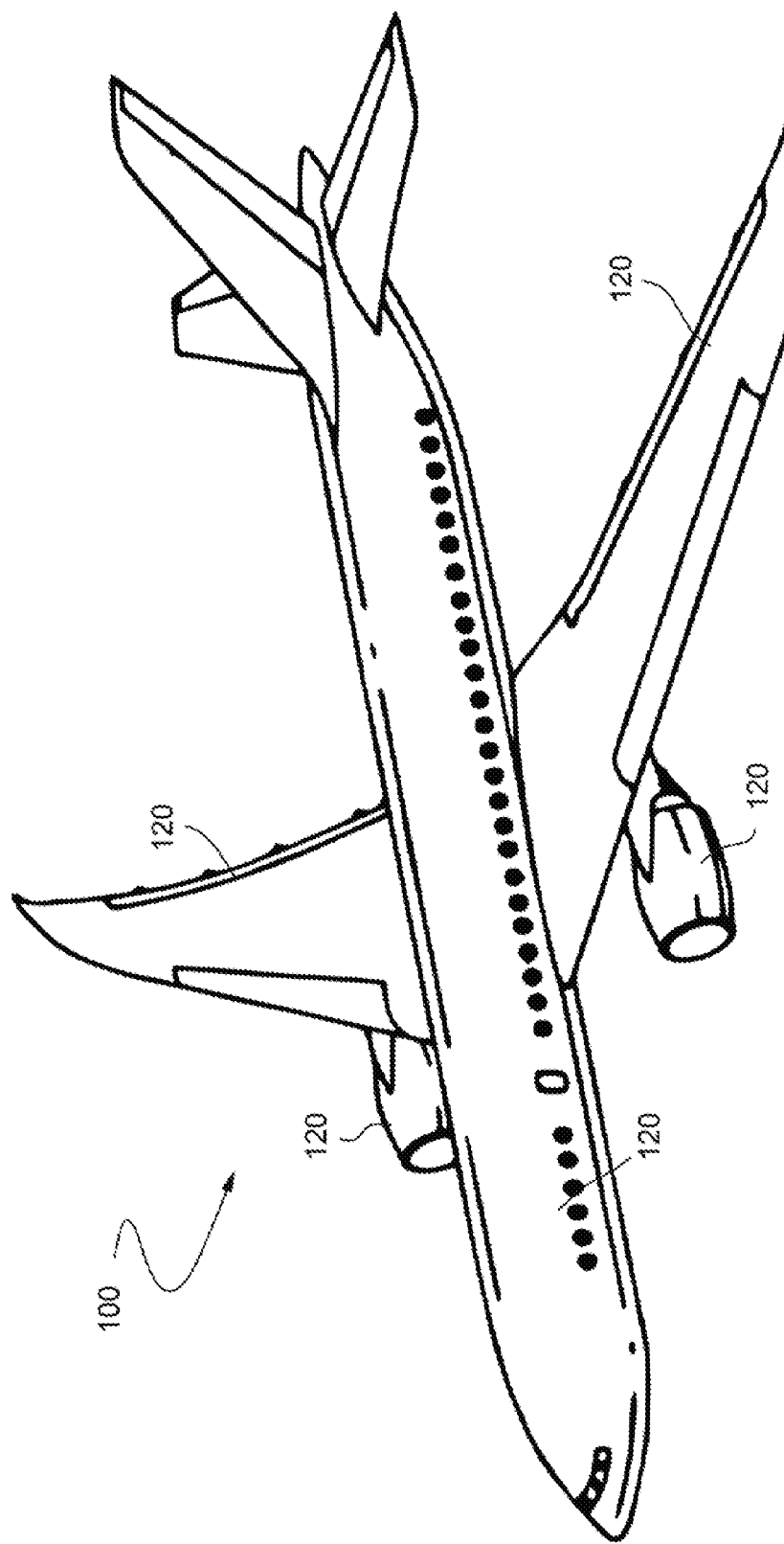
FIG. 1 illustrates a vehicle with composite structures, in accordance with some examples.

An example of a vehicle with such structures is shown in FIG. 1. FIG. 1 illustrates a vehicle with composite structures, in accordance with some examples. FIG. 1 illustrates a vehicle 100 that can be a fixed wing aircraft. In other examples, the systems and techniques described herein can be used to repair composites and structures of other types of vehicles such as other types of aircraft (e.g., helicopters, spacecraft, rockets, and other aircraft), automobiles, ships, submarines, and other such vehicles.

Vehicle 100 includes a plurality of vehicle structures 120. In various examples, vehicle structures 120 can be different portions of vehicle 100. For example, for the aircraft shown in FIG. 1, vehicle structures 120 can be a fuselage, a wing (e.g., a fixed portion of the wing or a flap or other movable portion), an aircraft propulsor (e.g., a nacelle or inlet of the aircraft propulsor), an empennage, or another structure of the aircraft. Various examples of vehicle structures 120 can be made of composites such as one or more of fiberglass, carbon fiber, Kevlar®, and other such composites.

Examples of Structures for No Vacuum Bag Composite Repair

Figure 2:
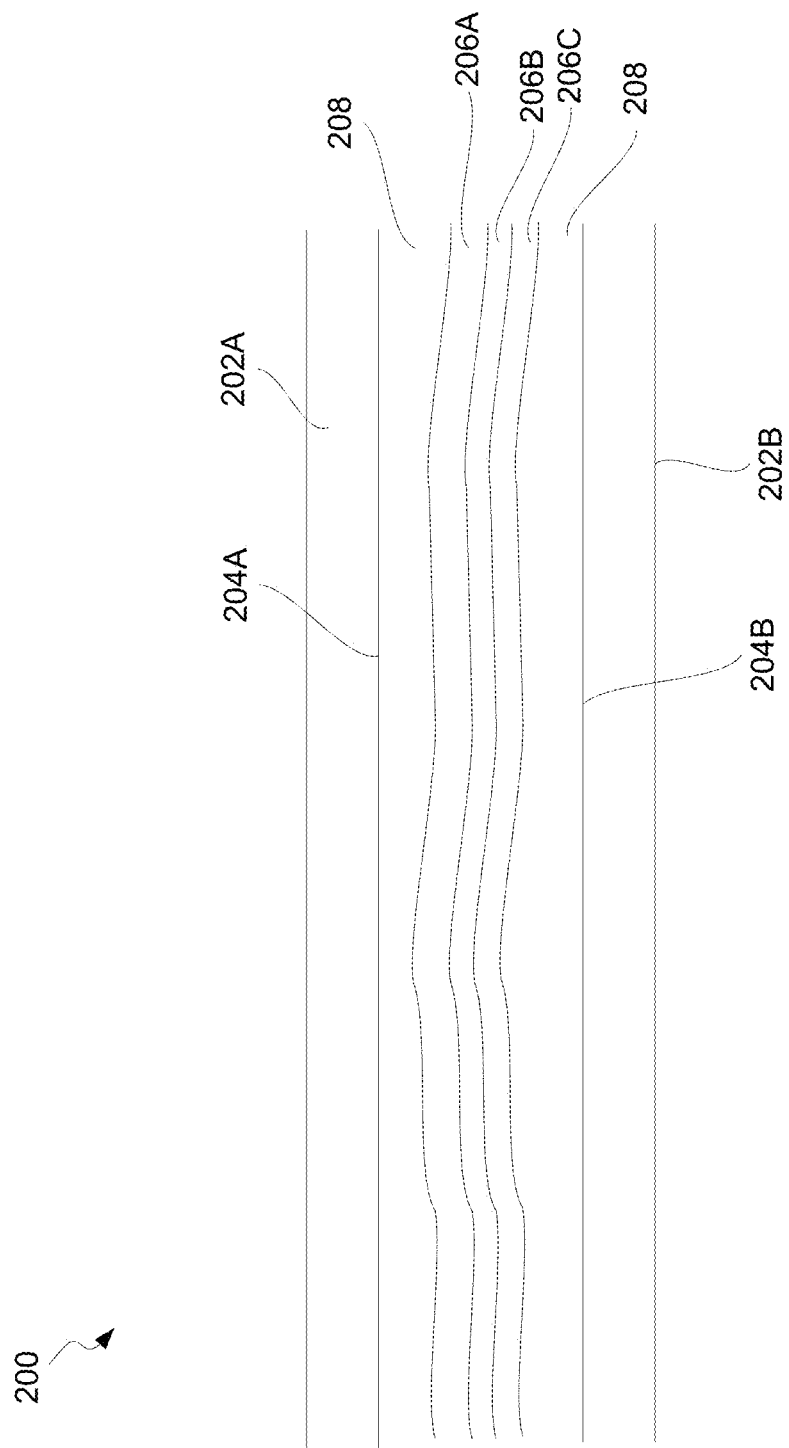
FIG. 2 illustrates a cross-sectional representation of a composite repair structure, in accordance with some examples.

FIG. 2 illustrates a cross-sectional representation of a composite repair structure, in accordance with some examples. FIG. 2 illustrates a composite repair structure 200 for use in repairing (e.g., patching) composite structures such as vehicle structures 120 described herein. In some examples, composite repair structure 200 is used to repair composite vehicle structures by, for example, coupling or bonding to the composite vehicle structure. For example, bonding of composite repair structure 200 to such vehicle structures is accomplished through application of positive pressure and heat and without the use of vacuum bagging. Composite repair structure 200 includes film sealant 202A and 202B and repair laminate 206A-C.

Repair laminate 206A-C includes composite plies such as one or more of carbon fiber plies, fiberglass plies, Kevlar® plies, and other such composite plies. In certain examples, layers of repair laminate is laid on top of each other to form the core repair structure. Though the example shown in FIG. 2 illustrates a composite repair structure 200 that includes three layers of repair laminate 206A-C, other examples can include any number of layers of repair laminate.

Repair laminate 206A-C is bonded together with resin 208 or another type of polymer. Resin 208 penetrates through the fibers of repair laminate 206A-C to solidify repair laminate 206A-C. In certain examples, repair laminate 206A-C is, for example, pre-impregnated (pre-preg) composites with resin 208 pre-impregnated within repair laminate 206A-C. The pre-preg is heated during production to liquefy resin 208, allowing resin 208 to penetrate the fibers of repair laminate 206A-C and displace any air within the fibers. As any air remaining within repair laminate 206A-C can weaken composite repair structure 200, repair laminate 206A-C is fully penetrated with resin 208 to fully displace any air during the production process. Fully displacing the air maximizes the strength of composite repair structure 200.

Repair structures are typically heated to bond the repair structures to vehicle structures. As repair structures are heated, resin will return to a liquid state. In conventional repair processes, containing the vehicle structure and repair structure within a vacuum bag prevents subsequent air intrusion while the resin is in the liquid state. However, without vacuum bagging, air and other volatiles will intrude into the resin and thus the repair laminate during conventional repair processes, causing porosity and weakening the structure.

Film sealant 202A and 202B is disposed on surfaces of repair laminate 206A-C. Thus, for example, film sealant 202A is disposed on a first surface of repair laminate 206A-C and film sealant 202B is disposed on a second surface of repair laminate 206A-C opposite the first surface. In various examples, film sealant is disposed on a variety of portions of repair laminate 206A-C or on all outer surfaces of repair laminate 206A-C. Film sealant (including film sealant 202A and 202B) prevents air intrusion to the repair laminate during bonding of composite repair structure 200 to vehicle structure 120. As the film sealant prevents air intrusion to the repair laminate, composite repair structure 200 can accordingly be bonded to a vehicle structure without the use of vacuum or vacuum bag.

In certain examples, to prevent intrusion of air and other volatiles, film sealant 202A and 202B has a higher minimum viscosity temperature than that of resin 208. Thus, film sealant 202A and 202B function as effective air barriers when the resin is most vulnerable to air intrusion (e.g., when the resin is at its lowest viscosity, such as when composite repair structure 200 is heated to bond composite repair structure 200 to vehicle structure 120). During the repair process, as the temperature increases due to heating, resin 208 then subsequently gels (e.g., the viscosity of resin 208 increases) to the point where air no longer or only minimally penetrates resin 208 and/or repair laminate 206A-C. At this increased temperature, viscosity of film sealant 202A and 202B can then be at its minimum level. Film sealant 202A and 202B can thus comingle with resin 208 and any adhesives on the vehicle structure, creating a strong and durable bond.

As such, film sealant 202A and 202B, as well as any other film sealant disposed on the surface of composite repair structure 200, allow for composite repair structure 200 to be bonded to vehicle structure 120 without the use of a vacuum bag while still preventing air and volatiles intrusion into resin 208.

Figure 3A:
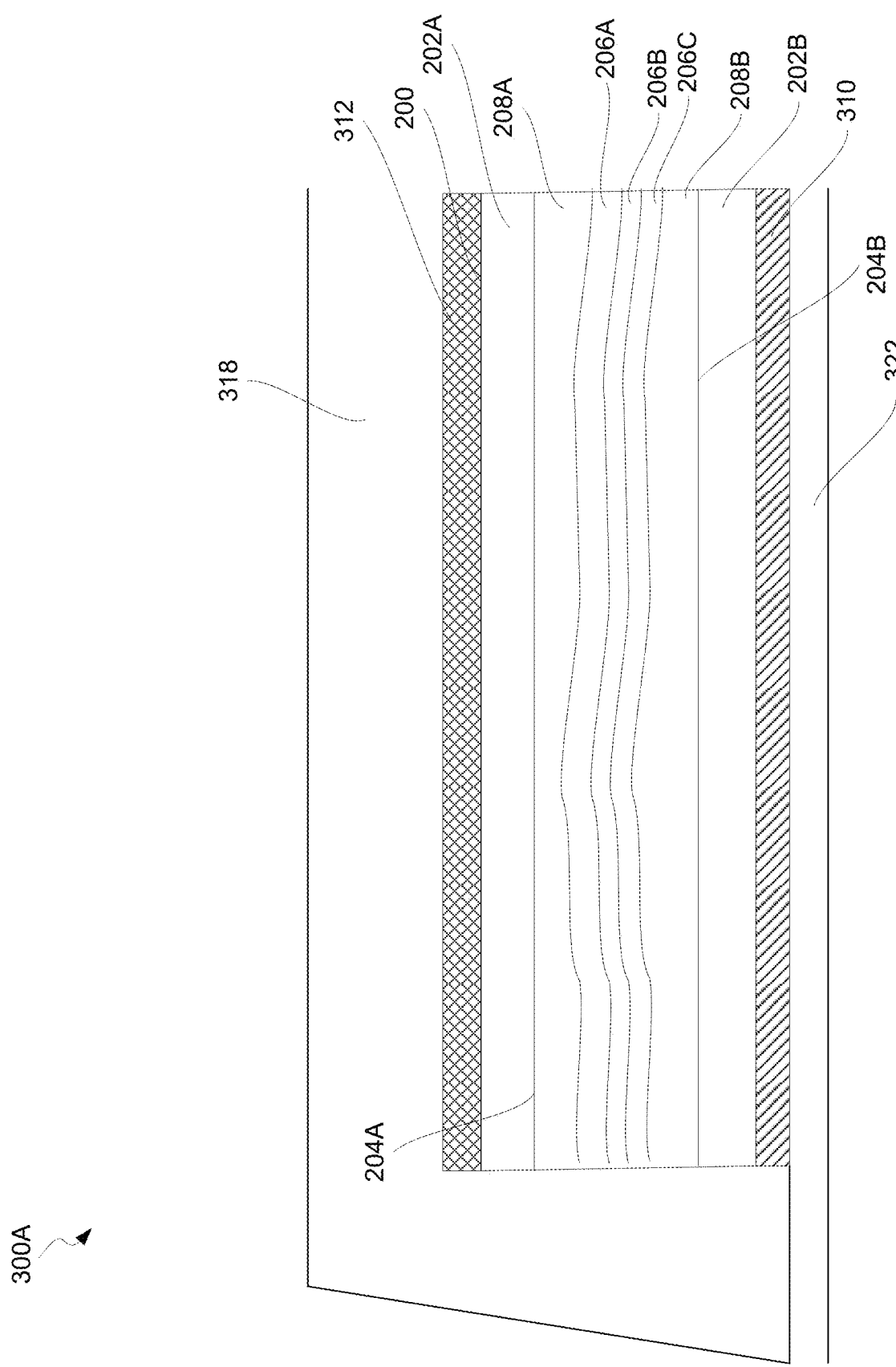
FIG. 3A illustrates a cross-sectional representation of a step in a technique of composite repair utilizing the composite repair structure of FIG. 2, in accordance with some examples.

Various steps of vacuum bag-less repair techniques are now illustrated herein. FIG. 3A illustrates a cross-sectional representation of a step in a technique of composite repair utilizing the composite repair structure of FIG. 2, in accordance with some examples. FIG. 3A illustrates an assembly 300A detailing a step when composite repair structure 200 is coupled to vehicle structure 120. Assembly 300A illustrates a step where composite repair structure 200 is positioned on vehicle structure 120 (e.g., to prepare for bonding during a patch repair).

Thus, composite repair structure 200 is placed over portion 322 of vehicle structure 120. In certain examples, portion 322 is a portion of vehicle structure 120 that requires repair. Film adhesive 310 is placed on portion 322. Film adhesive 310 is placed between portion 322 and composite repair structure 200. Film adhesive 310 encourages the bonding of composite repair structure 200 to portion 322.

Compaction bag 318 can optionally be placed over and/or contain composite repair structure 200 to provide a vacuum to properly seat composite repair structure 200 over portion 322. In certain examples, compaction bag 318 does not meet the typical vacuum requirements of a vacuum bag application. Instead, compaction bag 318 can be a temporary compaction bag for seating composite repair structure 200. In certain examples, a release film 312 is disposed between composite repair structure 200 and compaction bag 318 to promote release of compaction bag 318 from composite repair structure 200 once composite repair structure 200 is seated. After use, compaction bag 318 can be discarded. Alternatively, in some examples, compaction bag 318 is vented to atmosphere to remove vacuum from repair laminate 206 and positive pressure and/or heat is applied through or over compaction bag 318.

Figure 3B:
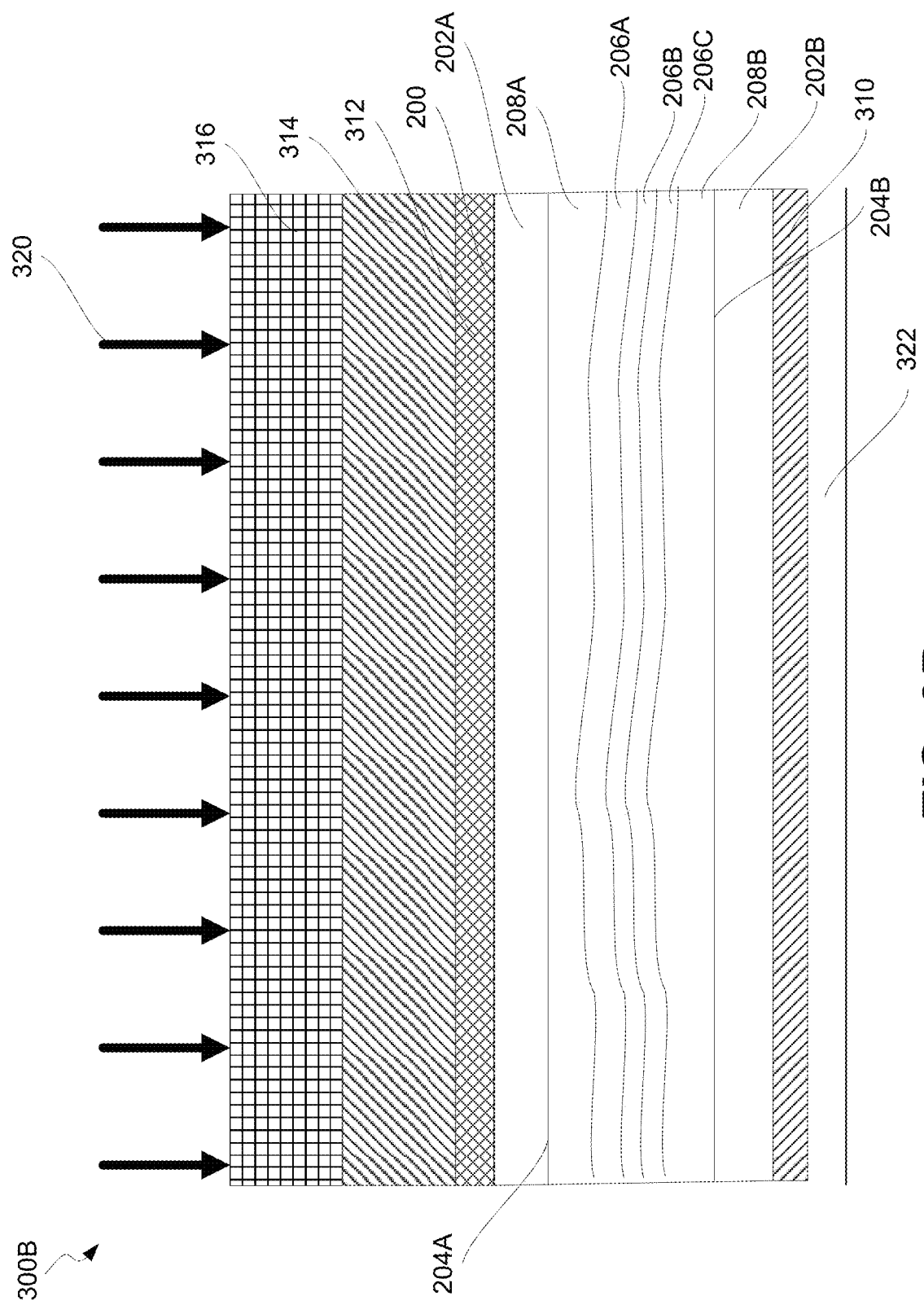
FIG. 3B illustrates a cross-sectional representation of another step in the technique of composite repair utilizing the composite repair structure of FIG. 3A, in accordance with some examples.

FIG. 3B illustrates a cross-sectional representation of another step in the technique of composite repair utilizing the composite repair structure of FIG. 3A, in accordance with some examples. FIG. 313 illustrates an assembly 300B detailing a step when composite repair structure 200 is bonded to vehicle structure 120.

In certain examples, after composite repair structure 200 is coupled to vehicle structure 120, release film 312 is disposed over composite repair structure 200. A compliance layer 314 is then applied over release film 312. In certain such examples, compliance layer is a thin (e.g., 0.5 inch or thinner), low durometer, thermally conductive material that will conform to the shape of the repair (e.g., of composite repair structure 200) to provide better load transfer to composite repair structure 200.

Heating blanket 316 is disposed over compliance layer 314. Heating blanket 316 is configured to provide heat to composite repair structure 200 and/or portion 322 to allow composite repair structure 200 to bond to portion 322. Additionally, in certain examples, a layer of silicone rubber foam (e.g., between 0.25 to 2 inches thick) is placed over heating blanket 316 to thermally isolate the repair from items that provide positive pressure 320 to the repair.

Heating blanket 316 provides heat to increase the temperature of composite repair structure 200 and/or vehicle structure 120. Certain examples of heating blanket 316 are configured to heat composite repair structure 200 to a variety of different temperatures.

Thus, for such examples, heating blanket 316 increases the temperature of composite repair structure 200 through a period of time by continuously providing heat to composite repair structure 200. As such, composite repair structure 200 is heated through a period of time. For example, composite repair structure 200 is first heated to a first temperature whereby resin 208 is more viscous or liquid to aid in bonding with vehicle structure 120.

As the temperature increases, resin 208 begins to harden while film sealant 202A and 202B becomes more viscous or liquid. The decreasing viscosity of film sealant 202A and 202B allows film sealant 202A and 202B to comingle with resin 208 and any adhesives of vehicle structure 120, creating a strong and durable bond.

In certain examples, positive pressure 320 is further provided to create a strong and durable bond. Positive pressure as described herein denotes any sort of pressure applied. For example, positive pressure includes pressure provided by weight (e.g., shot or sand bags), a machine (e.g., an actuator, a clamp, press, or other machine), a pneumatic bladder or through other techniques to provide pressure. In some examples, positive pressure 320 is any amount of pressure, including pressure of between 1 to 10 pounds per square inch (psi) applied to composite repair structure 200. Positive pressure 320 further bonds composite repair structure 200 to vehicle structure 120 by allowing resin 208, film sealant 202A and/or 202B, and/or any adhesives of vehicle structure 120 to comingle and/or mix to form a strong bond.

Examples of Method for No Vacuum Bag Composite Repair

Figure 4:
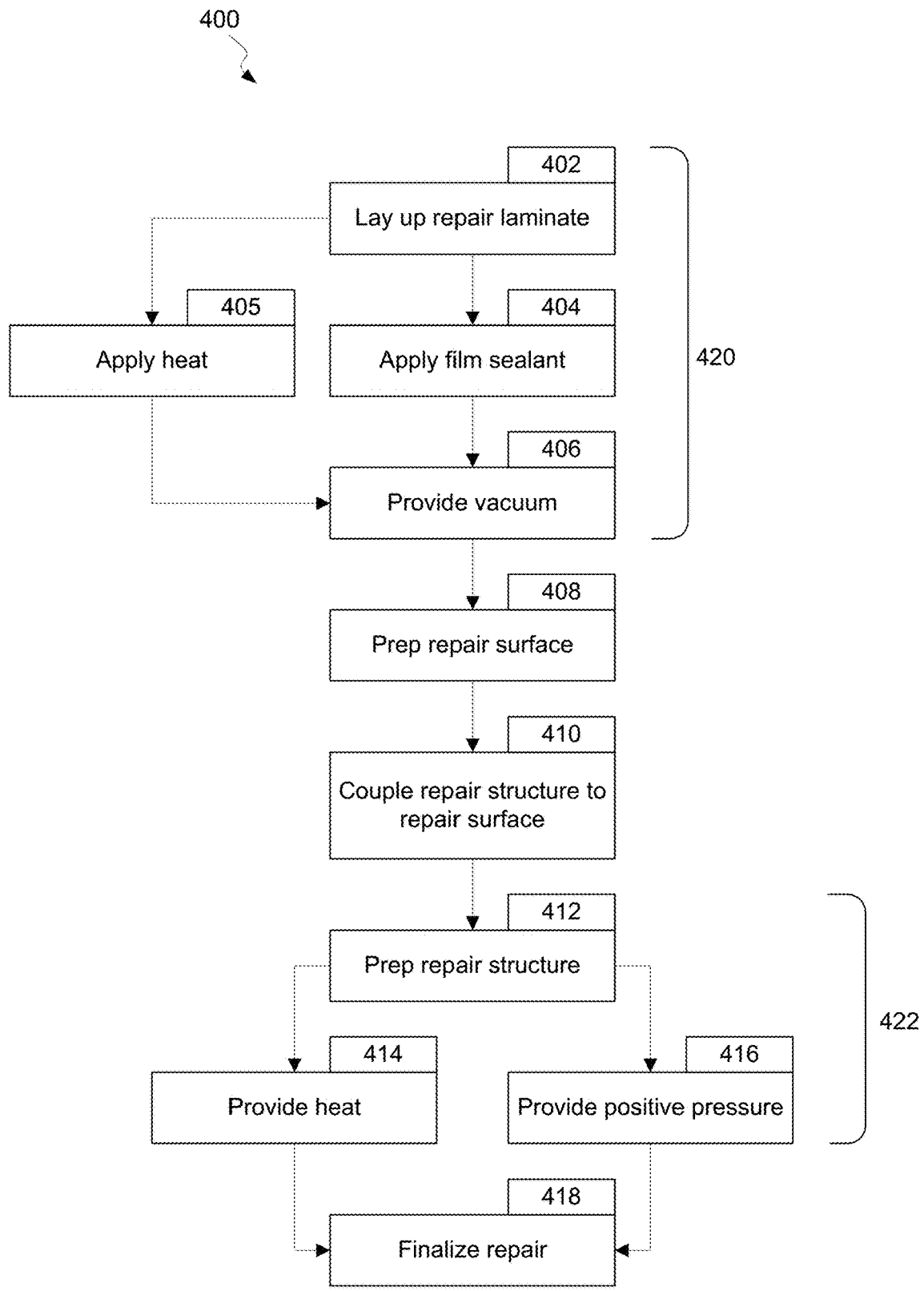
FIG. 4 is a process flowchart corresponding to a method of composite repair, in accordance with some examples.

FIG. 4 is a process flowchart corresponding to a method of composite repair, in accordance with some examples. Various operations of method 400 of FIG. 4 are executed using systems and apparatus described herein. Steps 402 to 406 describe forming 420 of composite repair structure 200, while steps 408 to 418 describe the repair of a vehicle structure with the composite repair structure.

In step 402, repair laminate 206 is laid up. In certain examples, repair laminate 206 includes a plurality of composite plies (e.g., carbon fiber composite plies). The plies laid up in step 402 form repair laminate 206. In step 404, film sealant 202 is applied to the outer surfaces of repair laminate 206. Film sealant 202 prevents air and volatile intrusion into resin 208 and/or repair laminate 206 during vacuum bag-less bonding to vehicle structure 120.

In step 406, composite repair structure 200 is disposed within a vacuum chamber and vacuum is provided to composite repair structure 200. Such vacuum is be applied, for example, in a double vacuum debulk chamber (as described in FIGS. 5A and 5B). Double vacuum debulk allows for removal of volatiles from repair laminate 206 without the use of an autoclave. Double vacuum debulk allows for application of heat and vacuum to composite repair structure 200 without subjecting composite repair structure 200 to vacuum compaction (e.g., from atmospheric pressure acting on a vacuum bag).

Heat is applied during one or more of steps 402, 404, and 406 in step 405.

Heating of film sealant 202, repair laminate 206, resin 208, and/or another portion of composite repair structure 200 to various temperatures decreases resin and/or sealant viscosity and/or partially cures the resin and/or sealant to partially cure composite repair structure 200. In certain examples, heat is applied during both steps 402 and 404 to, for example, allow venting or degassing of entrapped air and gases from repair laminate 206 as well as, potentially, curing of repair laminate 206 in step 402 and curing of film sealant 202 in step 404, respectively. In other examples, heat is applied during step 406 to first decrease viscosity to allow venting of air from repair laminate 206 before then partially curing both repair laminate 206 and film sealant 202 simultaneously.

As such, after step 402, 404, 405, and/or 406, composite repair structure 200 is formed to be in a pliant intermediate state. Such an intermediate state allows for composite repair structure 200 to be coupled to and conform to a surface of a vehicle structure. Once coupled to the vehicle structure, heat and positive pressure is then applied to fully cure composite repair structure 200 into a solid state, as described herein.

Thus, after composite repair structure 200 has been formed, composite repair structure 200 is used to repair a vehicle structure in steps 408 to 418. In step 408, the surface of a portion of vehicle structure 120 to be repaired is prepped. Prepping includes, for example, applying film adhesive 310 over the surface of vehicle structure 120, cleaning and sanding of the surface of vehicle structure 120 (e.g., to promote better adhesion), and/or other such preparation activities.

After vehicle structure 120 has been prepped in step 408, composite repair structure 200 is coupled to vehicle structure 120 in step 410, according to techniques described herein. Thus, for example, composite repair structure 200 is positioned over a portion of vehicle structure 120 to be repaired. In certain examples, compaction bag 318 is also be disposed over composite repair structure 200 to seat composite repair structure 200 over the proper portion of vehicle structure 120.

Composite repair structure 200 is thus be properly positioned over vehicle structure 120. Afterwards, composite repair structure 200 is then cured and/or bonded 422 to vehicle structure 120 or a portion therefore in steps 412 to 416. Curing and/or bonding 422 includes, for example, prepping of composite repair structure 200 in step 412. Prepping of composite repair structure 200 includes, for example, applying release film 312 and/or disposing compliance layer 314 over composite repair structure 200.

Heat and positive pressure is then applied in steps 414 and 416, respectively, to cure and/or bond 422 composite repair structure 200 to vehicle structure 120. In certain examples, composite repair structure 200 and vehicle structure 120 is co-bonded. That is, composite repair structure 200 (e.g., repair laminate 206) is cured while simultaneously bonded to vehicle structure 120 (which is a second cured laminate).

In step 416, positive pressure is applied through the techniques described herein (e.g., mechanically, through weight, through force exerted on the surface of composite repair structure 200, or other another technique). In step 414, heat is applied to composite repair structure 200 and/or vehicle structure 120 through, for example, heat emitted by heating blanket 316, emitted by heating lamps, emitted by heat guns, or from another source. Composite repair structure 200 is thus be bonded to vehicle structure 120. The repair is then be finalized in step 418 by, for example, surfacing (e.g., smoothing) and finishing (e.g., painting) of the repair.

Manufacturing Chamber for the Composite Repair Structure

Figure 5A:
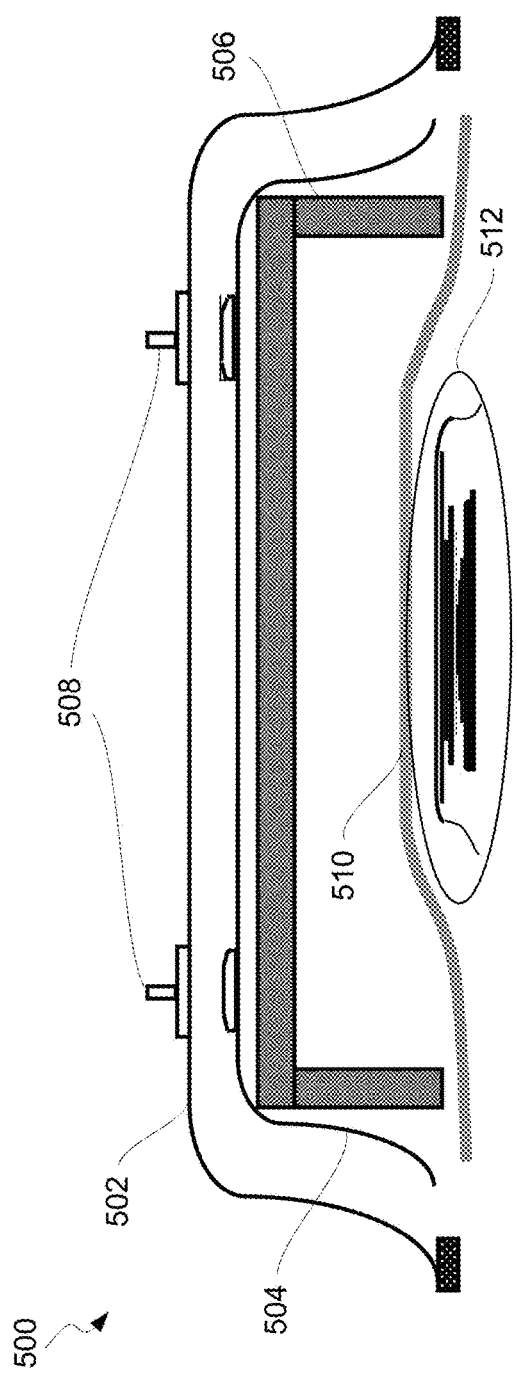
FIG. 5A illustrates a cross-sectional representation of a double vacuum debulk chamber, in accordance with some examples.

As described herein, composite repair structure 200 is at least partially formed in a double vacuum debulk chamber. FIG. 5A illustrates a cross-sectional representation of a double vacuum debulk chamber, in accordance with some examples. Double vacuum debulk allows for removal of volatiles from repair laminate 206, after repair laminate 206 has been laid up, without the use of an autoclave by applying heat and vacuum while forming composite repair structure 200 without subjecting composite repair structure 200 to vacuum compaction.

Double vacuum debulk chamber 500 shown in FIG. 5A includes an upper bagging film 502, a breather cloth 504, a hardback 506, vacuum probes 508, a breather 510, and a lower bag 512. Composite repair structure 200 is disposed within lower bag 512 during forming thereof. Upper bagging film 502 is a vacuum bag and is configured to contain a vacuum. Vacuum probes 508 allow for adjustment of vacuum within upper bagging film 502.

Hardback 506 is disposed over lower bag 512 and, in certain examples, is a rigid or semi-rigid structure. In certain examples, hardback 506 prevents upper bagging film 502 from imparting force on lower bag 512 when there is a vacuum within upper bagging film 502. As vacuum is generated within upper bagging film 502, hardback 506 prevents compaction force from the vacuum within upper bagging film 502 from being imparted onto composite repair structure 200 (contained within lower bag 512). Thus, hardback 506 allows composite repair structure 200 to be formed within a vacuum, but without being subjected to compaction forces from the vacuum.

Figure 5B:
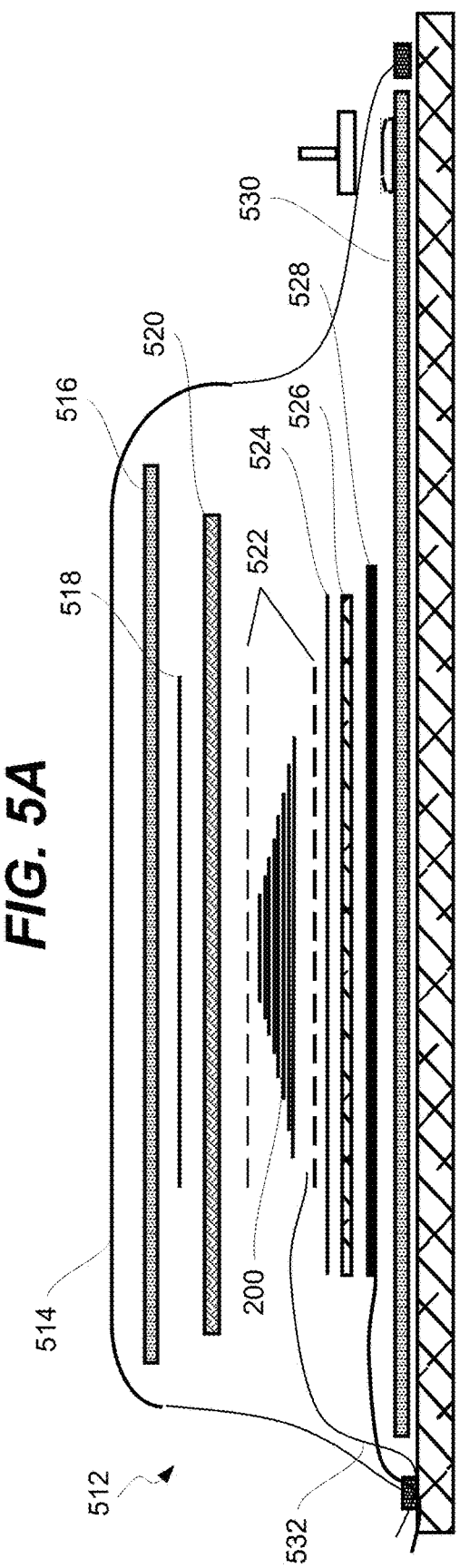
FIG. 5B illustrates a cross-sectional representation of a lower bag of the double vacuum debulk chamber of FIG. 5A, in accordance with some examples.

FIG. 5B illustrates a cross-sectional representation of a lower bag of the double vacuum debulk chamber of FIG. 5A, in accordance with some examples. FIG. 5B further illustrates lower bag 512. Lower bag 512 shown in FIG. 5B includes a lower bagging film 514, a breather 516, nonporous release film 518 and 524, a bleeder 520, porous or perforated release film or fabric 522, a thermally conductive sheet 526, heating element 528, a breather 530, and electrical circuitry 532. In the example shown, composite repair structure 200 is disposed within the layers of porous or perforated release film or fabric 522.

Electrical circuitry 532 provides electrical power to heating element 528. Heating element 528 is, for example, a heating blanket. Heating element 528 generates heat from the provided electrical power. The heat is then used to reduce the resin viscosity of the composite repair structure 200. In some examples, preventing air compaction while repair laminate 206 is formed (e.g., when vacuum is generated and heat is provided by heating element 528) allows for the extraction of gases and other volatiles from the fibers of repair laminate 206. The reduced viscosity of resin 208 allows for resin 208 to flow into the volume previously occupied by the gases and volatiles. In certain examples, resin 208 can then occupy most or all of the space around the fibers of repair laminate 206.

In certain examples, after extraction of the gases and volatiles, hardback 506 is vented to atmosphere. Atmospheric pressure is then able to impart a compaction force on lower bag 512 and, thus, composite repair structure 200 to form composite repair structure 200 to the final shape. By applying compaction forces only after the gases and volatiles are extracted, the techniques described herein allow for venting of trapping of gases and volatiles and, thus, avoid trapping of such gases and volatiles within composite repair structure 200. Such a technique produces a stronger composite repair structure 200. Afterwards, composite repair structure 200 is removed from double vacuum debulk chamber 500 and ready to bond to a vehicle structure.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 600 as shown in FIG. 6A and vehicle 100 as shown in FIG. 6B in applicable to such other contexts.

Figure 6A:
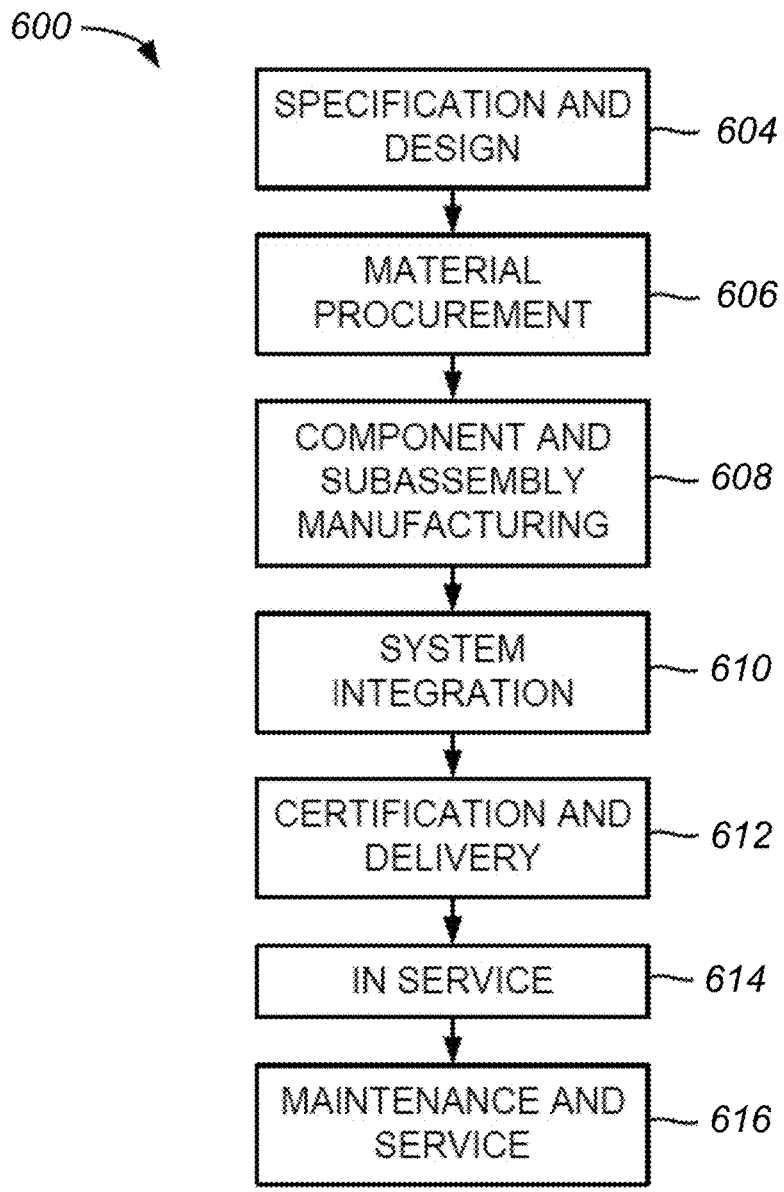
FIG. 6A illustrates a flow chart of an example of an aircraft production and service methodology, in accordance with some examples.

FIG. 6A illustrates a flow chart of an example of a vehicle production and service methodology, in accordance with some examples. In some examples, during pre-production, method 600 includes the specification and design 604 of vehicle 100 (e.g., an aircraft as shown in FIG. 1) and material procurement 606. During production, component and subassembly manufacturing 608 and system integration 610 of vehicle 100 takes place. Thereafter, vehicle 100 goes through certification and delivery 612 in order to be placed in service 614. While in service by a customer, the vehicle 100 is scheduled for routine maintenance and service 616 (e.g., modification, reconfiguration, refurbishment, and so on).

In certain examples, each of the processes of method 600 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator can be an airline, leasing company, military entity, service organization, and so on.

Figure 6B:
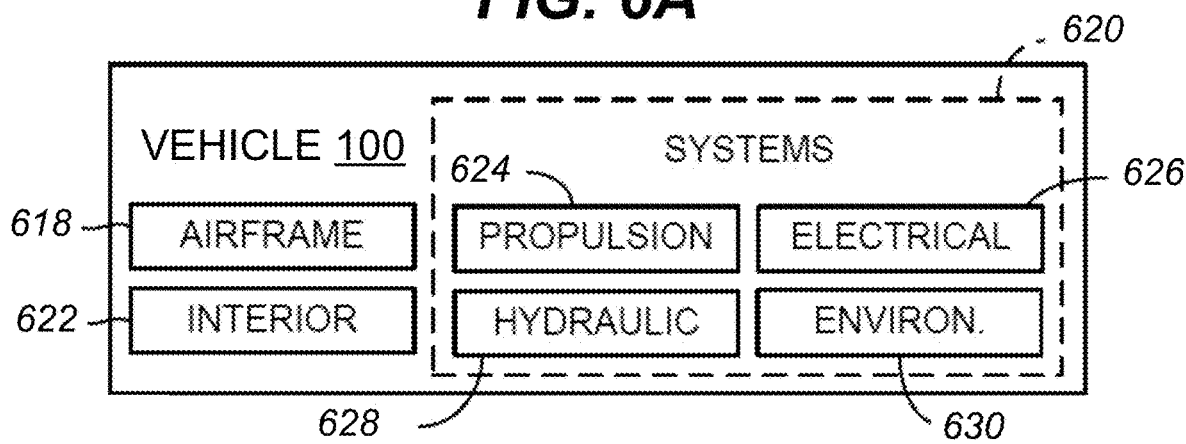
FIG. 6B illustrates a block diagram of an example of a vehicle, in accordance with some examples.

FIG. 6B illustrates a block diagram of an example of a vehicle, in accordance with some examples. As shown in FIG. 6B, the vehicle 100 (e.g., an aircraft) produced by method 600 includes airframe 618 with plurality of systems 620, and interior 622, Examples of systems 620 include one or more of propulsion system 624, electrical system 626, hydraulic system 628, and environmental system 630. In various examples, other systems are also included within vehicle 100. Although an aerospace example is shown, the principles of the embodiments disclosed herein is applicable to other industries, such as the automotive industry.

Conclusion

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. A method comprising:
forming a composite repair structure, wherein the composite repair structure comprises a repair laminate, wherein the repair laminate comprises a resin with a resin minimum viscosity temperature, wherein the forming the composite repair structure comprises applying a film sealant with a sealant minimum viscosity temperature to a first surface of the repair laminate, wherein the sealant minimum viscosity temperature is higher than the resin minimum viscosity temperature, and wherein the sealant minimum viscosity temperature is a temperature where the resin at least partially gels;
coupling the composite repair structure to a vehicle structure; and
curing and/or bonding the composite repair structure to the vehicle structure by:
providing a positive pressure to the composite repair structure coupled to the vehicle structure; and
increasing the temperature of the resin from the resin minimum viscosity temperature, where the film sealant prevents air intrusion into the repair laminate, to the sealant minimum viscosity temperature, where the at least partially gelled resin prevents air intrusion.

2. The method of claim 1, wherein the curing and/or bonding the composite repair structure further comprises prepping the composite repair structure after coupling the composite repair structure to the vehicle structure, wherein the prepping the composite repair structure comprises:
applying a release film to a portion of the composite repair structure; and
applying a compliance layer to the portion of the composite repair structure.

3. The method of claim 2, wherein a weight is coupled to the composite repair structure to apply positive pressure on the composite repair structure.

4. The method of claim 1, wherein forming the composite repair structure further comprises:
laying up the repair laminate;
applying heat to the repair laminate to degas the repair laminate; and
applying the film sealant to the first surface.

5. The method of claim 4, wherein the applying the heat to the repair laminate to degas the repair laminate comprises:
reducing a viscosity of a resin of the repair laminate; and
covering fibers of the repair laminate with the resin.

6. The method of claim 1, wherein the vehicle structure comprises a composite material.

7. The method of claim 6, wherein the composite material comprises one or more of fiberglass, carbon fiber, Kevlar®, and other such composite materials.

8. The method of claim 1, wherein the curing and/or bonding the composite repair structure to the vehicle structure further comprises providing heat to the composite repair structure coupled to the vehicle structure.

9. The method of claim 1, wherein the film sealant is further applied to a second surface opposite the first surface of the repair laminate.

10. The method of claim 1, wherein the positive pressure is provided without vacuum.

11. The method of claim 1, wherein the forming the composite repair structure further comprises:
applying heat to the composite repair structure to degas the composite repair structure;
disposing the composite repair structure within a chamber, wherein the chamber is configured to minimize compaction on the composite repair structure when a vacuum is present within the chamber; and
providing the vacuum within the chamber.

12. The method of claim 1, wherein at the sealant minimum viscosity temperature, the film sealant comingles with the resin.

13. The method of claim 1, wherein the forming the composite repair structure further comprises laying up a plurality of repair laminate.

14. The method of claim 1, wherein the coupling the composite repair structure to the vehicle structure comprises:
applying film adhesive to a portion of the vehicle structure;
coupling the composite repair structure to the film adhesive;
disposing a compaction bag over the composite repair structure after the composite repair structure has been coupled to the film adhesive to seat the composite repair structure; and
removing the compaction bag.

15. The method of claim 1, wherein the composite repair structure is coupled to the vehicle structure when the vehicle structure is coupled to a vehicle.

16. The method claim 1, wherein the film sealant is further disposed on a second surface opposite the first surface of the repair laminate.

17. The method of claim 1, wherein at the sealant minimum viscosity temperature, the film sealant comingles with the resin.

18. The method claim 1, wherein the film sealant is configured to prevent air intrusion into the repair laminate during curing and/or bonding of the composite repair structure to the vehicle structure when at the resin minimum viscosity temperature.

19. The method of claim 1, wherein the vehicle structure is a propulsor, a fuselage, or a wing.

20. The method of claim 1, wherein the vehicle structure is a fixed wing, a movable wing portion, or a movable flap structure of an aircraft.

* * * * *